United States Patent
Hwang et al.

(10) Patent No.: US 12,082,119 B2
(45) Date of Patent: Sep. 3, 2024

(54) COMMUNICATION DEVICE AND METHOD FOR PERFORMING MEASUREMENT THROUGH MULTIPLE ANTENNA PANELS

(71) Applicant: LG ELECTRONICS INC., Seoul (KR)

(72) Inventors: Jinyup Hwang, Seoul (KR); Ilnam Cho, Seoul (KR); Yoonoh Yang, Seoul (KR); Sangwook Lee, Seoul (KR); Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 17/597,275

(22) PCT Filed: Jun. 16, 2020

(86) PCT No.: PCT/KR2020/007767
§ 371 (c)(1),
(2) Date: Dec. 30, 2021

(87) PCT Pub. No.: WO2021/002609
PCT Pub. Date: Jan. 7, 2021

(65) Prior Publication Data
US 2022/0330160 A1    Oct. 13, 2022

(30) Foreign Application Priority Data
Jul. 2, 2019 (KR) .................. 10-2019-0079545

(51) Int. Cl.
  *H04W 52/02* (2009.01)
  *H04W 24/08* (2009.01)
  *H04W 24/10* (2009.01)
(52) U.S. Cl.
  CPC ....... *H04W 52/0274* (2013.01); *H04W 24/08* (2013.01); *H04W 24/10* (2013.01)

(58) Field of Classification Search
  CPC .................................. H04W 52/0274
  See application file for complete search history.

(56) References Cited

U.S. PATENT DOCUMENTS

| 2011/0065448 A1 | 3/2011 | Song et al. |
| 2020/0029274 A1* | 1/2020 | Cheng .................. H04W 76/28 |

(Continued)

FOREIGN PATENT DOCUMENTS

CN          202871980 U  *  4/2013

OTHER PUBLICATIONS

PCT International Application No. PCT/KR2020/007767, International Search Report dated Sep. 11, 2020, 2 pages.

(Continued)

*Primary Examiner* — Samina F Choudhry
(74) *Attorney, Agent, or Firm* — LEE, HONG, DEGERMAN, KANG & WAIMEY

(57) ABSTRACT

One disclosure of the present specification provides a method by which a communication device, which performs a measurement through multiple antenna panels, reports the measurement. The method may include the steps of: transmitting capability information to a base station; receiving measurement setting information from the base station; powering on a powered-off antenna panel among the multiple antennal panels in order to perform a measurement; performing the measurement through the multiple antenna panels; and transmitting a measurement report message including information indicating whether the corresponding antenna panel was in a powered-on state or a powered-off state prior to the measurement, and information on the measurement result.

12 Claims, 20 Drawing Sheets

(56) References Cited

U.S. PATENT DOCUMENTS

2020/0169995 A1\* 5/2020 Nam .................... H04W 72/21
2020/0229104 A1\* 7/2020 MolavianJazi ... H04W 72/1268
2020/0260376 A1\* 8/2020 Islam ................ H04W 52/0212

OTHER PUBLICATIONS

Huawei et al., "Panel-based UL beam selection," 3GPP TSG RAN WG1 Meeting #96, R1-1903091, Feb.-Mar. 2019, 7 pages.
Motorola Mobility et al., "Power control for multi-panel uplink transmission," 3GPP TSG RAN WG1 #96, R1-1902849, Feb.-Mar. 2019, 5 pages.
CATT, "UE Power Saving Scheme with Adaptation," 3GPP TSG RAN WG1 Meeting #AH 1901, R1-1900344, Jan. 2019, 12 pages.
ZTE, "Discussion on UL power control for multi-panel operation," 3GPP TSG RAN WG1 Meeting #96, R1-1901643, Feb.-Mar. 2019, 3 pages.

\* cited by examiner

COMMUNICATION DEVICE AND METHOD FOR PERFORMING MEASUREMENT THROUGH MULTIPLE ANTENNA PANELS

CROSS-REFERENCE TO RELATED APPLICATIONS

This application is the National Stage filing under 35 U.S.C. 371 of International Application No. PCT/KR2020/007767, filed on Jun. 16, 2020, which claims the benefit of earlier filing date and right of priority to Korean Patent Application No. 10-2019-0079545, filed on Jul. 2, 2019, the contents of which are all incorporated by reference herein in their entirety.

TECHNICAL FIELD

The present specification relates to mobile communications.

BACKGROUND

With the success of long term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

For the 5G mobile communication, new radio access technology(new RAT or NR) has been researched.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

Meanwhile, LTE/LTE-A technology and NR technology may also be used for vehicle communication. This is called vehicle-to-everything (V2X). Communication technology through all interfaces with the vehicle is commonly called V2X.

Communication between V2X devices without going through a base station is called V2X communication, and a link used for communication between V2X devices is also called a sidelink.

The vehicle may be equipped with multiple antenna panels to receive signals from multiple directions. Each antenna panel forms a predetermined number of transmit/receive beams to form beams to transmit signals coming from a specific direction or in a specific direction. In this case, the communication device transmits and receives signals through the transmission/reception beams of one antenna panel or some antenna panels, and the other antenna panels are not used. In the case of an unused antenna panel, if it is always kept in the 'power on' state, power consumption is greatly increased.

SUMMARY

Therefore, the disclosure of the present specification is to propose method for solving the above-mentioned problems.

In order to solve the above-mentioned problems, One disclosure of the present specification provides a method of a communication device for performing measurements through a plurality of antenna panels, comprising: transmitting capability information to a base station; receiving measurement configuration information from the base station; performing power-on an antenna panel in power-off state among the plurality of antenna panels for measurement; performing measurement through the plurality of antenna panels; and transmitting a measurement report message including information indicating whether the corresponding antenna panel was in power-on state or power-off state before the performing measurement, and information on a result of the measurement.

In order to solve the above-mentioned problems, One disclosure of the present specification provides a communication device for performing measurements through a plurality of antenna panels comprising: at least one processor; and at least one memory for storing instructions and operably electrically connectable with the at least one processor, based on the instructions being operated by the at least one processor, performed operation comprising: transmitting capability information to a base station; receiving measurement configuration information from the base station; performing power-on an antenna panel in power-off state among the plurality of antenna panels for measurement; performing measurement through the plurality of antenna panels; and transmitting a measurement report message including information indicating whether the corresponding antenna panel was in power-on state or power-off state before the performing measurement, and information on a result of the measurement.

In order to solve the above-mentioned problems, One disclosure of the present specification provides a non-volatile computer readable storage medium having recorded instructions, wherein the instructions, based on being executed by one or more processors, cause the one or more processors to: transmit capability information to a base station; receive measurement configuration information from the base station; perform power-on an antenna panel in power-off state among the plurality of antenna panels for measurement; perform measurement through the plurality of antenna panels; and transmit a measurement report message including information indicating whether the corresponding antenna panel was in power-on state or power-off state before the performing measurement, and information on a result of the measurement.

Therefore, the disclosure of the present specification is to propose method for solving the above-mentioned problems.

DETAILED DESCRIPTION

Figure 1:
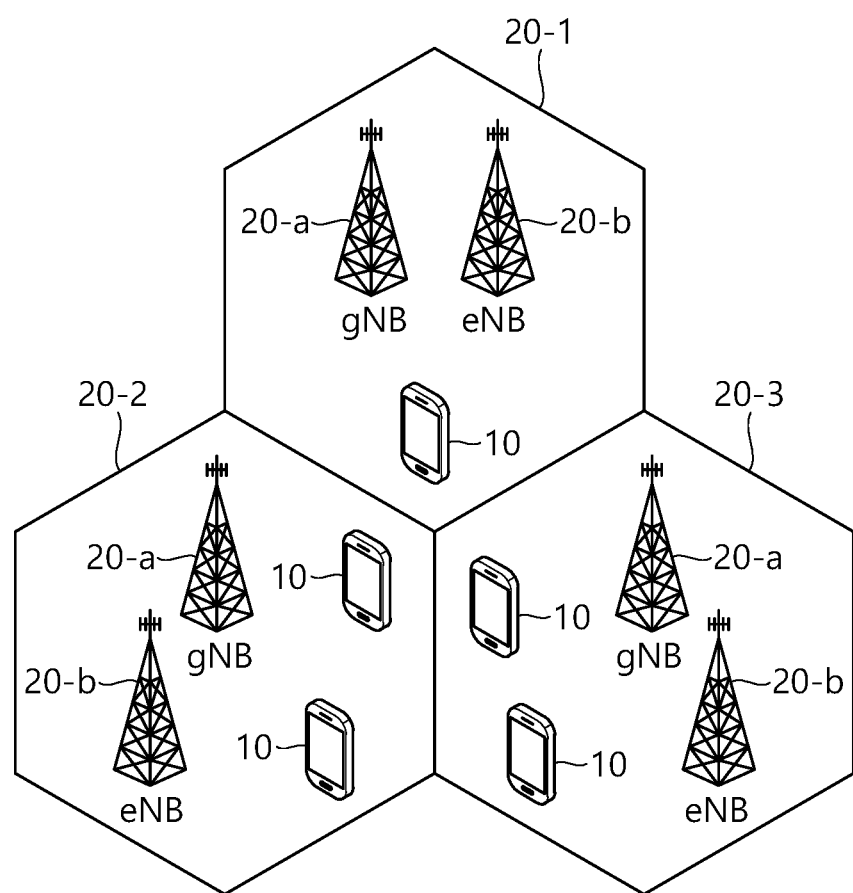
FIG. 1 is a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are individually described in one drawing in this specification may be implemented individually or simultaneously.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Hereinafter, the UE is used as an example of a device capable of wireless communication (eg, a wireless communication device, a wireless device, or a wireless device). The operation performed by the UE may be performed by any device capable of wireless communication. A device capable of wireless communication may also be referred to as a wireless communication device, a wireless device, or a wireless device.

A base station, a term used below, generally refers to a fixed station that communicates with a wireless device, which may be called other terms such as an evolved-NodeB (eNodeB), an evolved-NodeB (eNB), a BTS (Base Transceiver System), an access point (Access Point), gNB (Next generation NodeB).

FIG. 1 is a wireless communication system.

As can be seen with reference to FIG. 1, a wireless communication system includes at least one base station (BS). The BS is divided into a gNodeB (or gNB) 20a and an eNodeB (or eNB) 20b. The gNB 20a supports 5G mobile communication. The eNB 20b supports 4G mobile communication, that is, long term evolution (LTE).

Each base station 20a and 20b provides a communication service for a specific geographic area (commonly referred to as a cell) (20-1, 20-2, 20-3). A cell may in turn be divided into a plurality of regions (referred to as sectors).

A UE typically belongs to one cell, and the cell to which the UE belongs is called a serving cell. A base station providing a communication service to a serving cell is referred to as a serving base station (serving BS). Since the wireless communication system is a cellular system, other cells adjacent to the serving cell exist. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station (20) to the UE (10), and uplink means communication from the UE (10) to the base station (20). In the downlink, the transmitter may be a part of the base station (20), and the receiver may be a part of the UE (10). In the uplink, the transmitter may be a part of the UE (10), and the receiver may be a part of the base station (20).

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

Hereinafter, the LTE system will be described in more detail.

Figure 2:
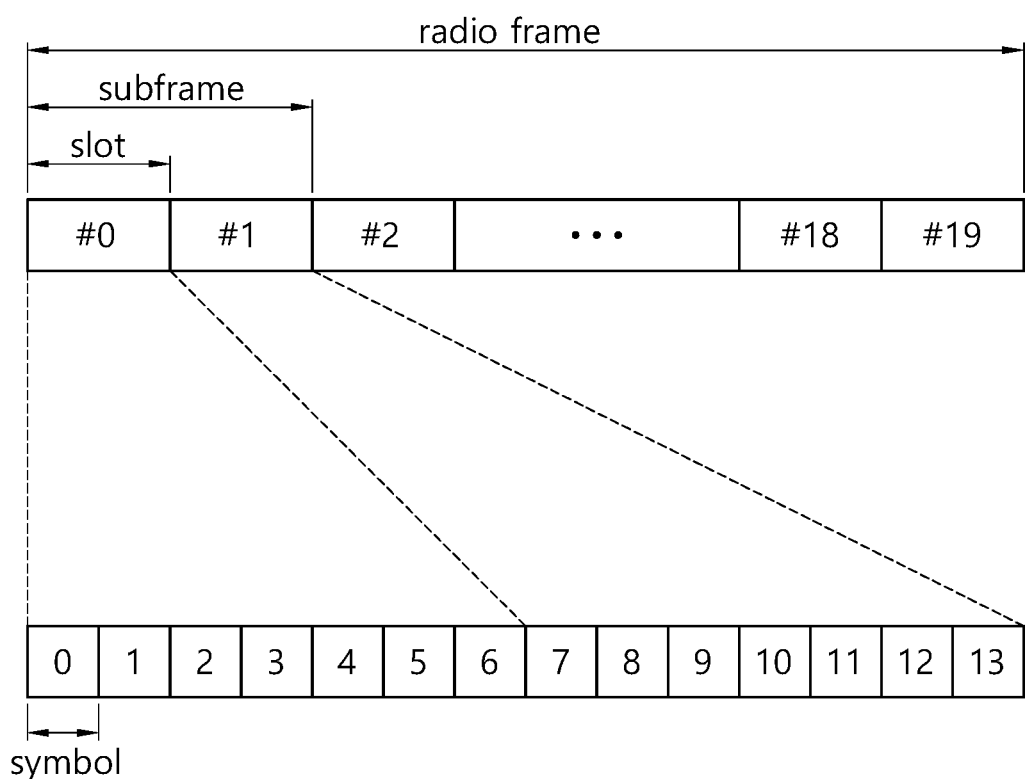
FIG. 2 shows the structure of a radio frame according to FDD in 3GPP LTE.

FIG. 2 shows the structure of a radio frame according to FDD in 3GPP LTE.

Referring to FIG. 2, a radio frame includes 10 subframes, and one subframe includes two slots. The slots in the radio frame are numbered from 0 to 19. The time it takes for one subframe to be transmitted is referred to as a transmission time interval (TTI). The TTI may be referred to as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame or the number of slots included in the subframe may be variously changed.

Meanwhile, one slot may include a plurality of orthogonal frequency division multiplexing (OFDM) symbols. How many OFDM symbols are included in one slot may vary according to a cyclic prefix (CP).

One slot includes NRB resource blocks (RBs) in a frequency domain. For example, in the LTE system, the number of resource blocks (RBs), that is, NRB may be any one of 6 to 110.

A resource block (RB) is a resource allocation unit and includes a plurality of subcarriers in one slot. For example, if one slot includes 7 OFDM symbols in the time domain and the resource block includes 12 subcarriers in the frequency domain, one resource block may include 7*12 resource elements (REs).

In 3GPP LTE, physical channels are divided into data channels, such as PDSCH (Physical Downlink Shared Channel) and PUSCH (Physical Uplink Shared Channel), and control channels, such as PDCCH (Physical Downlink Control Channel), PCFICH (Physical Control Format Indicator Channel), PHICH (Physical Hybrid-ARQ Indicator Channel) and PUCCH (Physical Uplink Control Channel).

The uplink channel includes PUSCH, PUCCH, SRS (Sounding Reference Signal), and PRACH(Physical Random Access Channel).

<Next-Generation Mobile Communication Network>

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

The ITU proposes three usage scenarios, for example, eMBB(enhanced Mobile BroadBand), mMTC(massive Machine Type Communication) and URLLC(Ultra Reliable and Low Latency Communications).

URLLC relates to usage scenarios that require high reliability and low latency. For example, services such as autonomous driving, factory automation, and augmented reality require high reliability and low latency (eg, latency of 1 ms or less). Currently, the delay time of 4G (LTE) is statistically 21-43 ms (best 10%) and 33-75 ms (median). This is insufficient to support services requiring latency of less than 1ms. Next, the eMBB usage scenario relates to a usage scenario requiring mobile ultra-wideband.

That is, the 5th generation mobile communication system may target higher capacity than the current 4G LTE, increase the density of mobile broadband users, and support D2D (Device to Device), high stability, and MTC (Machine type communication). 5G R&D also aims to achieve lower latency and lower battery consumption than 4G mobile communication systems to better realize the Internet of Things. For such 5G mobile communication, a new radio access technology (New RAT or NR) may be proposed.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

<Operation Bands in NR>

The operating bands in NR are as follows.

The operating band of Table 3 below is an operating band converted from the operating band of LTE/LTE-A. This is called the FR1 band.

TABLE 3

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The table below shows the NR operating bands defined on the high frequency phase.
This is called the FR2 band.

TABLE 4

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

Figure 3A:
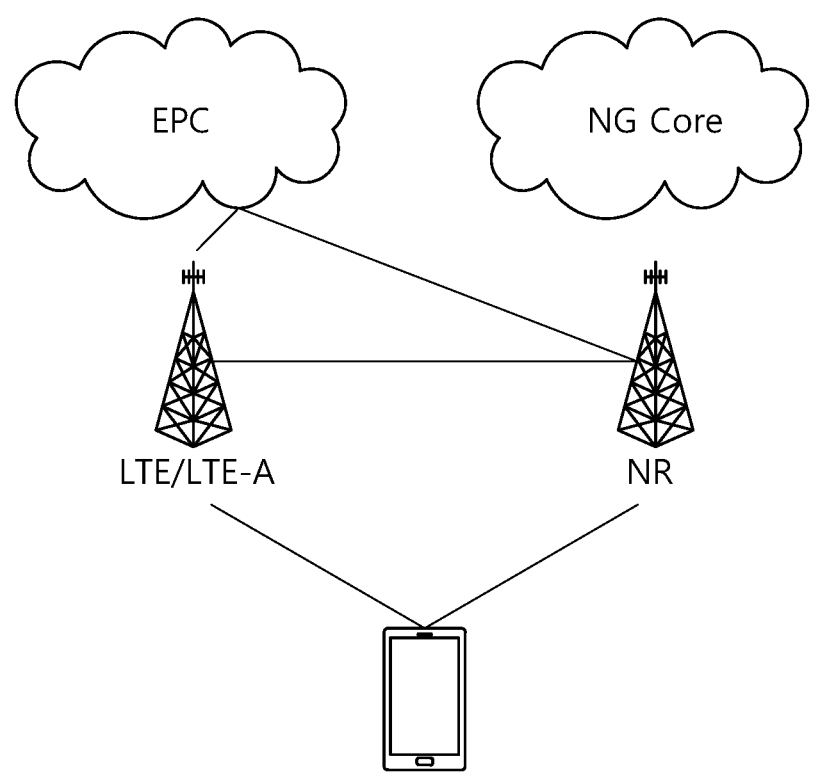
FIGS. 3a to 3c are exemplary diagrams illustrating an exemplary architecture for a service of next-generation mobile communication.
Figure 3B:
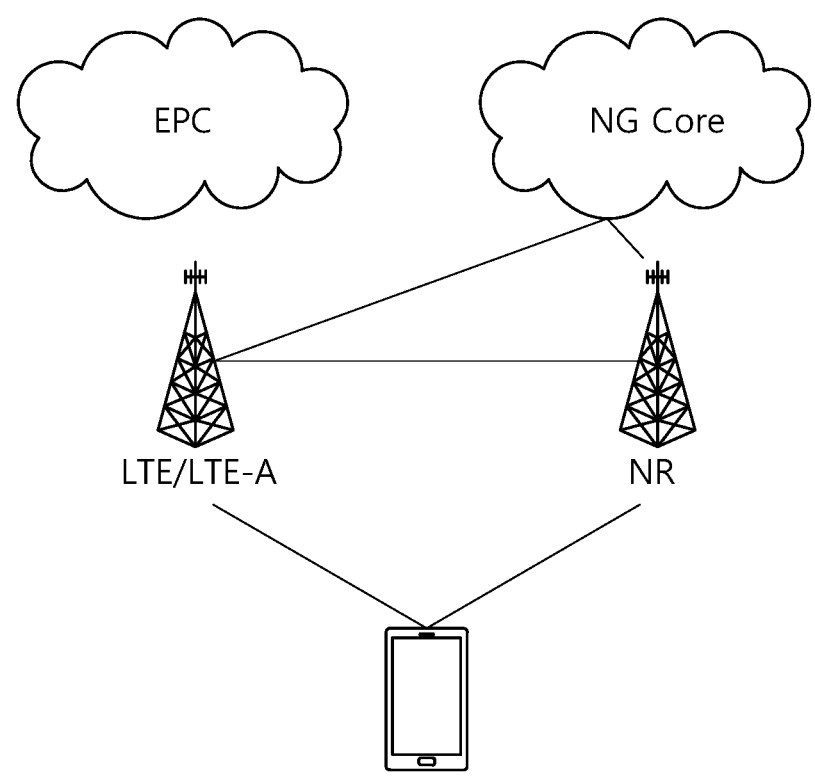
Figure 3C:
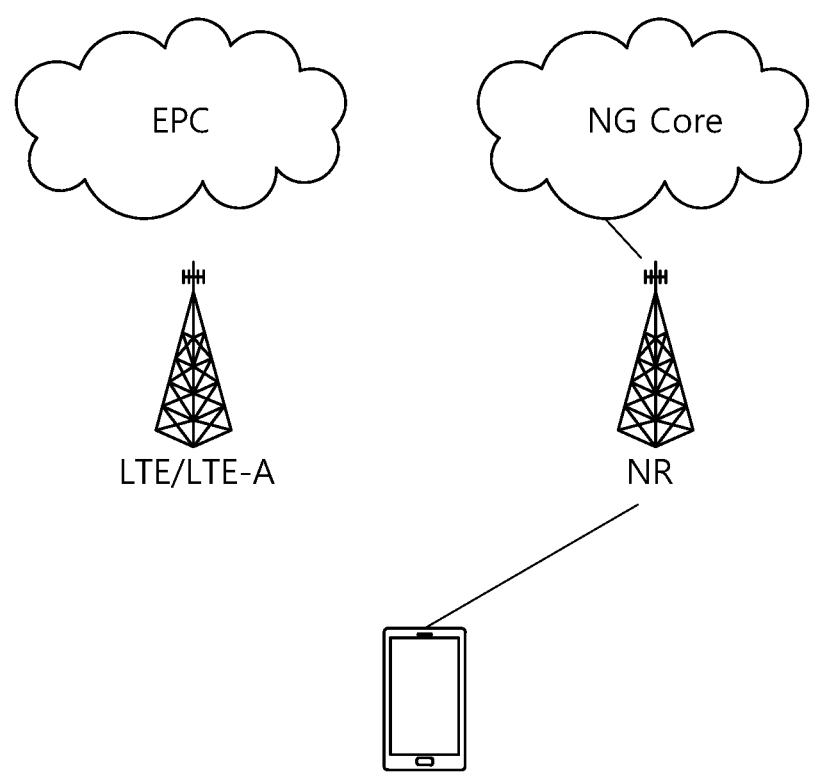

FIGS. 3a to 3c are exemplary diagrams illustrating an exemplary architecture for a service of next-generation mobile communication.

Referring to FIG. 3a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 3b, unlike FIG. 3a, an LTE/LTE-A-based cell is connected to a core network for 5G mobile communication, that is, the LTE/LTE-A-based cell is connected to a Next Generation (NG) core network.

A service method based on the architecture shown in FIG. 3a and FIG. 3b is referred to as NSA(non-standalone).

Referring to FIG. 3c, UE is connected only to an NR-based cell. A service method based on this architecture is called SA(standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 4:
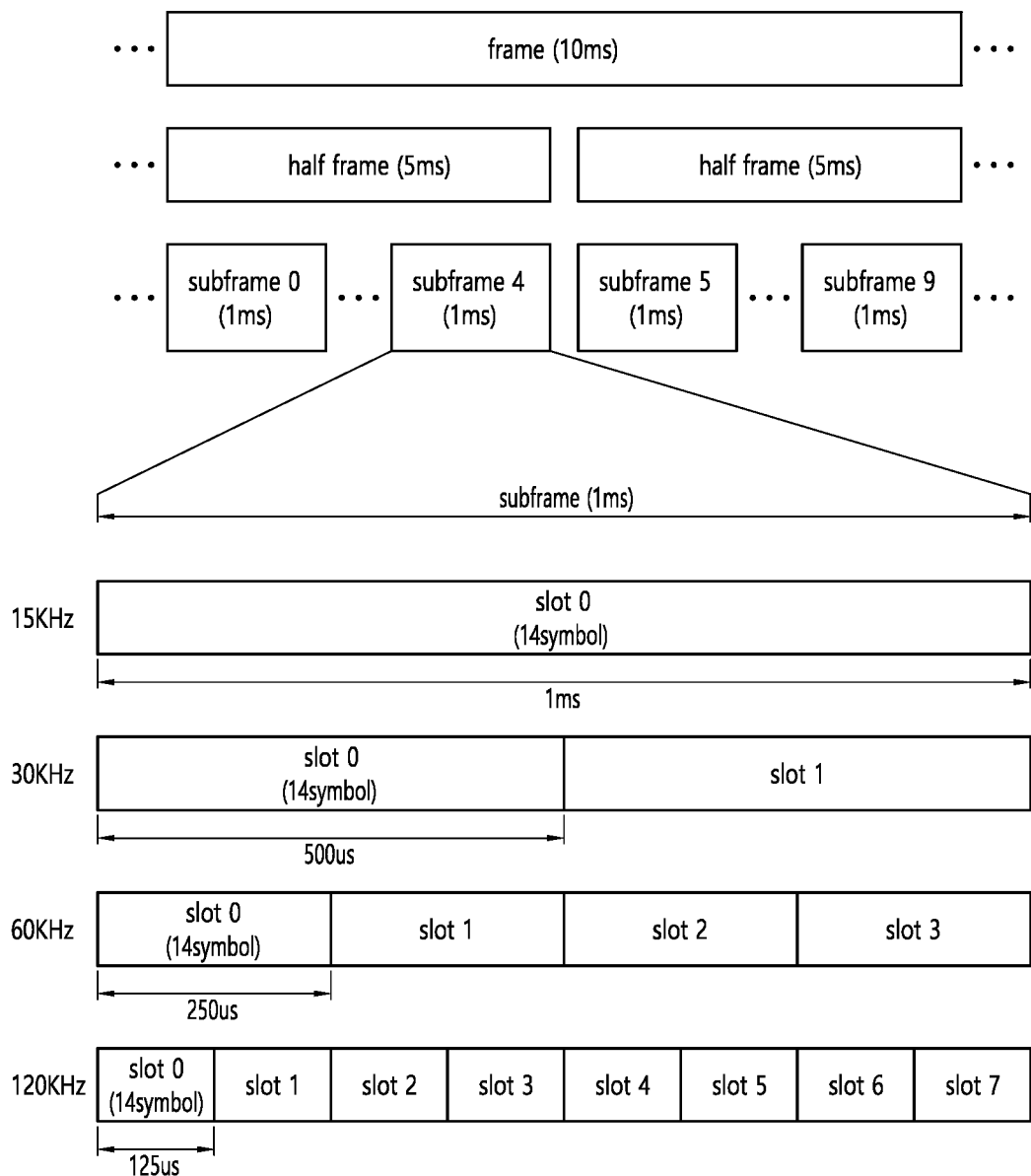
FIG. 4 illustrates structure of a radio frame used in NR.

FIG. 4 illustrates structure of a radio frame used in NR.

In NR, uplink and downlink transmission consists of frames. A radio frame has a length of 10 ms and is defined as two 5 ms half-frames (Half-Frame, HF). A half-frame is defined as 5 1ms subframes (Subframe, SF). A subframe is divided into one or more slots, and the number of slots in a subframe depends on SCS (Subcarrier Spacing). Each slot includes 12 or 14 OFDM(A) symbols according to CP (cyclic prefix). When CP is usually used, each slot includes 14 symbols. When the extended CP is used, each slot includes 12 symbols. Here, the symbol may include an OFDM symbol (or a CP-OFDM symbol) and an SC-FDMA symbol (or a DFT-s-OFDM symbol).

Figure 5:
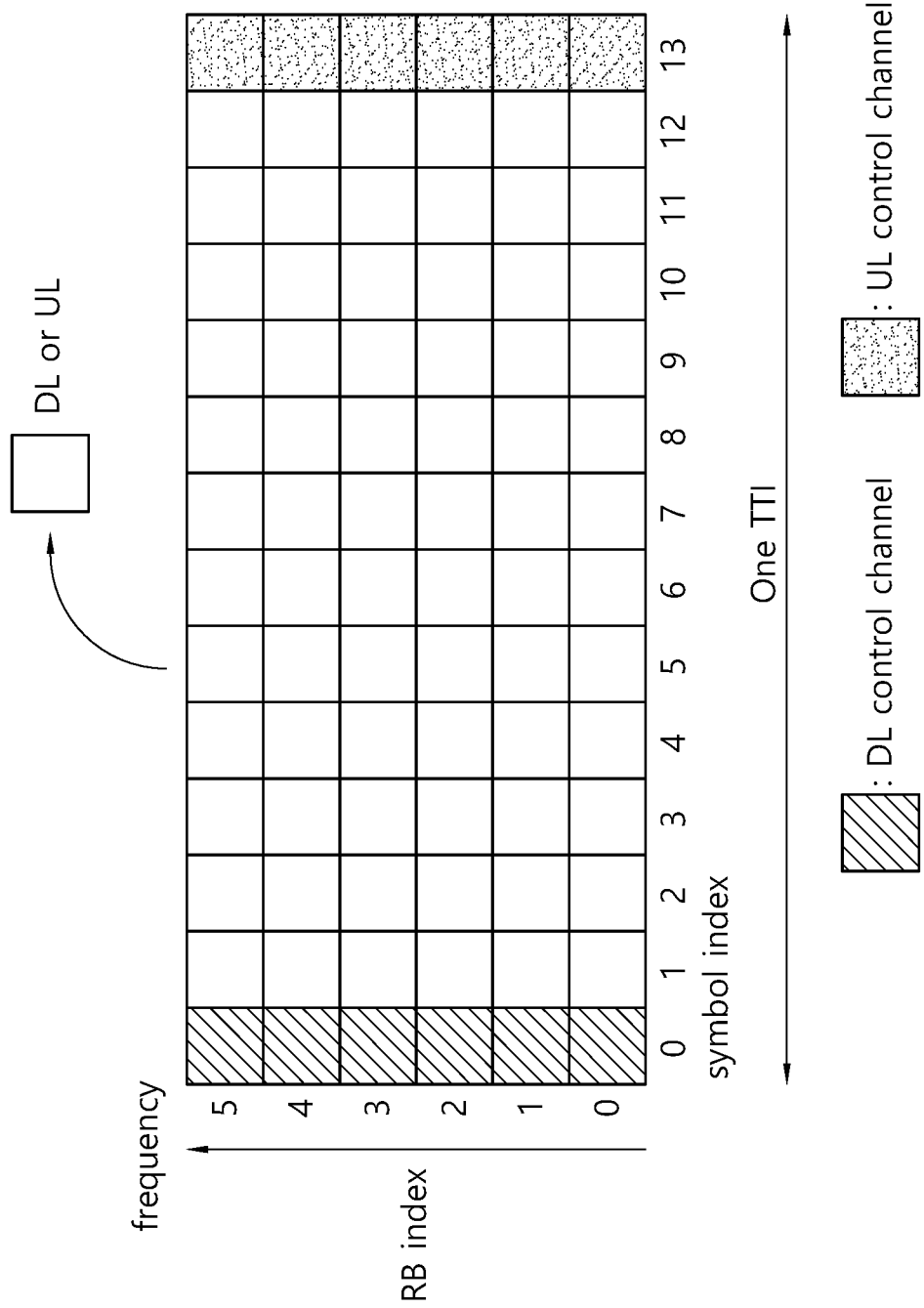
FIG. 5 shows an example of subframe types in NR.

FIG. 5 shows an example of subframe types in NR.

The TTI(transmission time interval) shown in FIG. 5 may be referred to as a subframe or a slot for NR (or new RAT). The subframe (or slot) of FIG. 5 may be used in a TDD system of NR (or new RAT) to minimize data transmission delay. As shown in FIG. 5, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot).

The structure of such a subframe (or slot) may be referred to as a self-contained subframe (or slot).

Specifically, the first N symbols in a slot may be used to transmit DL control channel (hereinafter, DL control region), and the last M symbols in a slot may be used to transmit UL control channel (hereinafter, UL control region). N and M are each an integer greater than or equal to 0. A resource region (hereinafter, referred to as a data region) between the DL control region and the UL control region may be used for DL data transmission or UL data transmission. For example, the PDCCH may be transmitted in the DL control region and the PDSCH may be transmitted in the DL data region. The PUCCH may be transmitted in the UL control region, and the PUSCH may be transmitted in the UL data region.

When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

TABLE 5

| M | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by $\mu$, the number of OLDM symbols per slot Nslotsymb, the number of slots per frame Nframe,µslot, and the number of slots per subframe Nsubframe,µslot are expressed as shown in the following table.

TABLE 6

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by $\mu$, the number of OLDM symbols per slot Nslotsymb, the number of slots per frame Nframe,µslot, and the number of slots per subframe Nsubframe,µslot are expressed as shown in the following table.

TABLE 7

| M | $N^{slot}_{symb}$ | $N^{frame,\mu}_{slot}$ | $N^{subframe,\mu}_{slot}$ |
|---|---|---|---|
| 2 | 12 | 40 | 4 |

<V2X(Vehicle-to-Everythihg)>

V2X (vehicle-to-everything) refers to communication technology through all interfaces with the vehicle. The implementation form of V2X may be as follows.

In V2X, 'X' may mean a person (Persian) or a pedestrian (PEDESTRIAN). In this case, V2X may be displayed as V2P(vehicle-to-person or vehicle-to-pedestrian). Here, the pedestrian is not necessarily limited to a person moving on foot, and may include a person riding a bicycle, a driver or a passenger of a vehicle (below a certain speed).

Alternatively, 'X' may be an infrastructure/network. In this case, V2X may be expressed as V2I (vehicle-to-infrastructure) or V2N (vehicle-to-network), and may mean communication between a vehicle and a roadside unit (ROADSIDE UNIT: RSU) or a vehicle and a network. The roadside device may be a device that informs traffic-related infrastructure, for example, a speed. The roadside device may be implemented in a base station or a fixed terminal.

Alternatively, 'X' in V2X may be a vehicle (VEHICLE). In this case, V2X may be expressed as V2V(vehicle-to-vehicle), and may mean communication between vehicles.

A wireless device mounted on a vehicle may be referred to as a V2V device or a V2X device.

Communication between V2X devices without going through a base station is called V2X communication, and a link used for communication between V2X devices is also called sidelink.

There are the followings as physical signals used in sidelink.

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

In addition, there are the following physical signals used in sidelink.

Demodulation Reference signal (DMRS)
Sidelink Synchronization signal (SLSS)

The SLSS includes a primary sidelink synchronization signal (PSLSS) and a secondary sidelink synchronization signal (Secondary SLSS: SSLSS).

Figure 6:
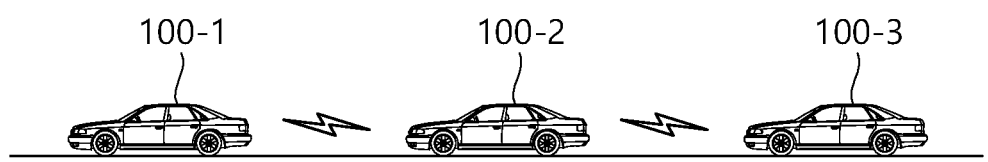
FIG. 6 is an exemplary diagram illustrating the concept of V2X.

FIG. 6 is an exemplary diagram illustrating the concept of V2X.

As can be seen with reference to FIG. 6, the wireless devices (ie, V2X devices) (100-1, 100-2, 100-3) mounted on the vehicle may communicate with each other.

<Problem to be Solved Through the Disclosure of the Present Specification)>

The above-described vehicle may be equipped with a plurality of antenna panels to receive signals from various directions. In addition, in order to receive signals from multiple directions not only in the vehicle described above, but also in multiple communication devices (eg, smartphones, robots, etc.) supporting the FR2 (ie, mmWave) band, directional transmission and reception through multiple antenna panels use a beam Each antenna panel forms a predetermined number of transmit/receive beams to form beams to transmit signals coming from a specific direction or in a specific direction. In this case, the communication device transmits and receives signals through the transmission/reception beams of one antenna panel or some antenna panels, and the other antenna panels are not used. In the case of an unused antenna panel, if it is always kept in the 'power on' state, power consumption is greatly increased.

Disclosures of the Present Specification

Accordingly, when a communication device uses a multi-antenna panel (in particular, when using a multi-antenna panel to use the FR2 (ie, mmWave) band), the disclosure of the present specification provides operation for turning on or off the power of an antenna panel according to the situation in order to reduce power consumption, and for this purpose, the present specification also provides a signal transmission/reception operation required between the network and the communication device.

Specifically, in order to reduce power consumption of a communication device having a plurality of antenna panels, an operation of 'powering off' an unused antenna panel is required. In addition, criteria for powering on/off the antenna panel and a signal that needs to be transmitted between a communication device and a network node (eg, a base station) for this purpose or a signal that needs to be transmitted between communication devices should be defined. It takes about 2-3 msec for stabilization by operating the powered-off antenna panel with power on.

This specification is described based on the V2X device of the vehicle to be equipped with a multi-antenna panel. However, the information mentioned in this specification may be applied to other communication devices as well.

The power on/off of the multi-antenna panel may be set according to the use environment or transmission/reception mode of the communication device, and since the operation of the communication device is limited in signal transmission/reception to the powered-off antenna panel, the operation of the communication device also affects operation of the network or communication device.

Since all communication devices don't use a multi-antenna panel, the communication device must report the presence or absence of a setting function for power on/off of the antenna panel to a communication device or a base station (gNB) transmitting a signal.

I. Transmission of Ability Information

Therefore, it is necessary to transmit capability information on the power on/off operation function for the antenna panel of the communication device. This will be described with reference to FIG. 7.

Figure 7:
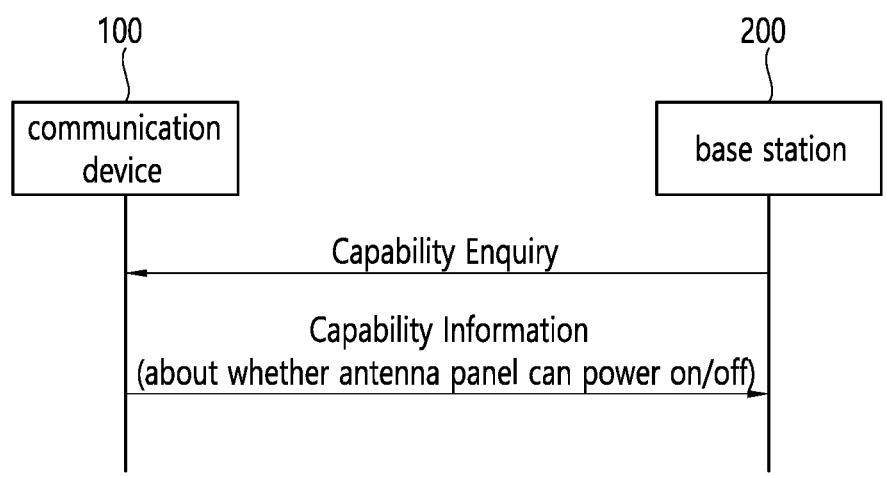
FIG. 7 is an exemplary diagram illustrating a process of transmitting capability information according to one disclosure of the present specification.

FIG. 7 is an exemplary diagram illustrating a process of transmitting capability information according to one disclosure of the present specification.

Referring to FIG. 7, the base station 200 transmits a capability inquiry message to the communication device 100.

Then, the communication device 100 transmits capability information to the base station 200. The capability information may include information on whether the communication device has the ability to power on/off each of the multi-antenna panels or information on whether the communication device supports the power on/off of each of the multi-antenna panels. The information included in the capability information may be expressed as a PanelOnOff parameter as shown in the table below.

TABLE 8

| -NR-Capability ::= | SEQUENCE { |
|---|---|
| PanelOnOff OPTIONAL, } | ENUMERATED {supported} |

When the communication device can power on/off each of the multi-antenna panels, the communication device may perform power-off on an unused antenna panel according to circumstances.

II. Operation of Powering On/Off the Antenna Panel of a Communication Device

II-1. Operation According to the Movement Speed of the Communication Device

When the communication device moves rapidly, the beam used by the communication device for transmitting and receiving signals and the antenna panel used by the communication device will change rapidly. In this case, when the power of the antenna panel is changed from off to on, a problem in signal transmission and reception may occur. Therefore, without turning off the power of the antenna panel of the communication device, the power of the antenna panel must be continuously turned on so that there is no problem in signal transmission and reception. When the communication device stops or moves at a low speed, the transmission/reception beam may be changed in order for the communication device to transmit/receive a signal, but the transmission/reception beam may be used within a candidate beam formed in one antenna panel. That is, when the moving speed X (eg, X km/h) of the communication device is greater than the threshold velocity $velocity_{th}$, the communication device always maintains the antenna panel on power-on, and the moving speed X (eg, X km/h) is smaller than the $velocity_{th}$, an operation of turning on/off the power of the antenna panel may be performed.

X (eg, X km/h)≥$velocity_{th}$: Power on for all antenna panels

X (eg, X km/h)<$velocity_{th}$: Power off an unused antenna panel.

The moving speed X (eg, X km/h) of the communication device may be the moving speed of the communication device itself, and The moving speed X may also be a relative speed with the transmitting communication device. For example, when transmitting and receiving a signal to and from the base station through the Uu link, X may be the speed of the communication device, and when transmitting and receiving a signal with another communication device (sidelink), X may be the relative speed with the communication device.

II-2. Operation According to Transmission/Reception Mode of Communication Device In the case of communication between communication devices (eg, V2X sidelink), methods such as unicast, groupcast, and broadcast may be used. In the case of unicast, since it is a signal transmission/reception with a specific communication device, there is not much change in the antenna panel used. In addition, even if the speed of the communication device is high, the unicast between the two communication devices is low relative speed, so a transmission/reception beam from a specific antenna panel is used. In the case of groupcast, a communication environment similar to that of unicast can be assumed because the transmitting communication device communicates with communication devices of a specific group. When a communication device considers a broadcast environment, in order to receive the same signal from multiple directions or signals from multiple directions, all antenna panels of the communication device must be used to change transmission/reception beams. Therefore, in the case of broadcast, power-on of all antenna panels must be maintained in order not to affect transmission/reception performance.

Unicast transmit/receive mode: Power off unused antenna panels

Groupcast transmit/receive mode: Power off unused antenna panels

Broadcast transmit/receive mode: Power on all antenna panels

II-3. Communication Device and Network Operation According to the Power On/Off of the Antenna Panel of the Communication Device In order to transmit a signal, a communication device selects an antenna panel and a beam to be used. If the power of the selected antenna panel is turned off, the communication device operates the antenna panel to be powered on in advance. As described above, by changing the power of the antenna panel from off to on before transmitting the signal, the signal transmission delay time may be reduced, so that the transmission performance may not be significantly affected.

However, when the receiving communication device receives a signal, when the base station or the transmitting communication device changes the transmission beam, the reception beam corresponding to the changed transmission beam must also be changed. When the changed reception beam is a reception beam of an antenna panel that is powered off of the reception side communication device, a delay time occurs in changing the power of the corresponding antenna panel from OFF to ON, and thus reception performance may be deteriorated. Therefore, the base station or the transmitting communication device transmitting the signal must transmit the signal in consideration of the power on/off operation of the antenna panel of the receiving communication device to reduce reception performance degradation.

A signal is required to inform the power on/off state of the antenna panel of the receiving-side communication device.

For example, when transmitting a measurement report as follows, information on whether the antenna panel is in an on/off state may be included and transmitted.

Figure 8:
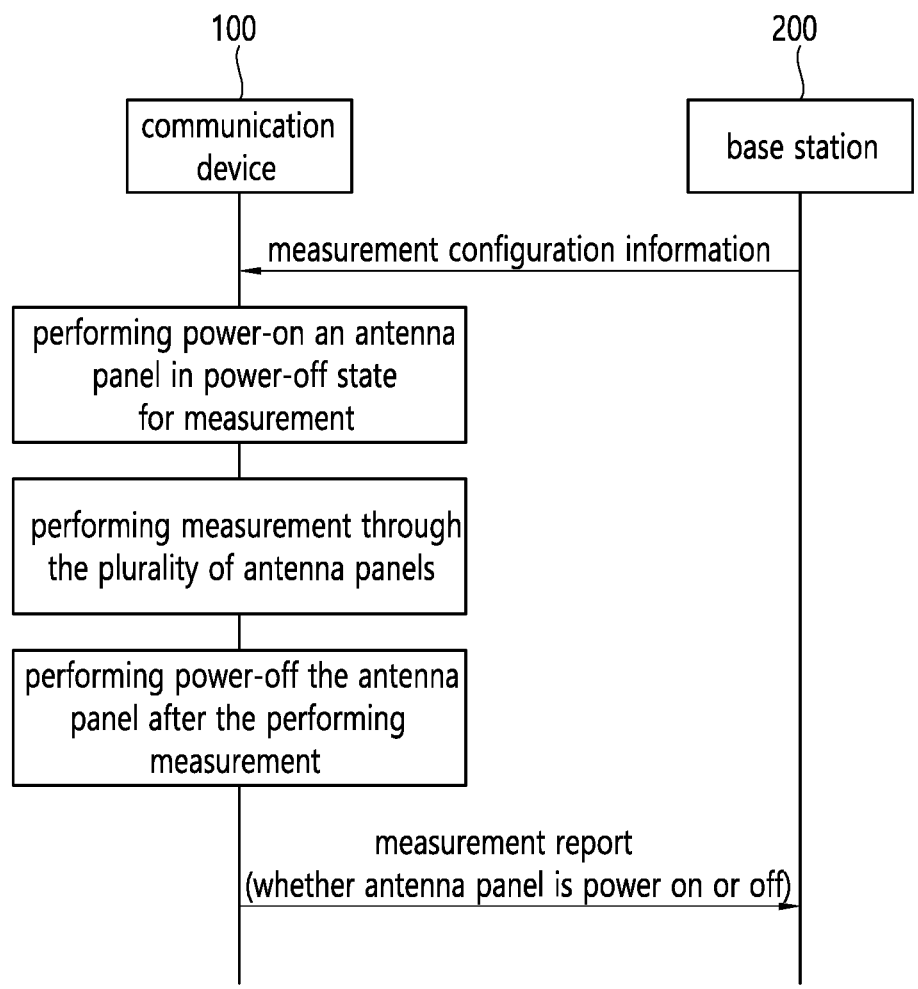
FIG. 8 is an exemplary diagram illustrating a process of transmitting capability information according to one disclosure of the present specification.

FIG. 8 is an exemplary diagram illustrating a process of transmitting capability information according to one disclosure of the present specification.

The communication device 100 receives measurement setting information.

The communication device 100 powers on an antenna panel in a power-off state among the plurality of antenna panels for measurement.

In addition, the communication device 100 performs measurement through a plurality of antenna panels.

When the measurement is completed, the communication device 100 changes the antenna panel, which was in the power-off state before the measurement, back to the power-off state.

The communication device 100 performs a measurement report. The measurement report may include information on the antenna panel that was in a power-off state before the measurement or was in a power-off state after the measurement. The information may be a beamforPanel parameter.

The beamforPanel parameter may be included in ResultsPerSSB-Index or ResultsPerCSI-RS-Index as shown in the table below.

TABLE 9

| | |
|---|---|
| ResultsPerS SB-Index ::= | SEQUENCE { |
| ssb-Index | SSB-Index, |
| ssb-Results | MeasQuantityResults |
| OPTIONAL, | |
| beamforPanel | BOOLEAN |
| | OPTIONAL |
| } | |
| ResultsPerCSI-RS-Index ::= | SEQUENCE { |
| csi-RS-Index | CSI-RS-Index, |

TABLE 9-continued

| csi-RS-Results | MeasQuantityResults |
|---|---|
| OPTIONAL, | |
| beamforPanel | BOOLEAN |
| | OPTIONAL |
| } | |

In the table above, the beamforPanel parameter is a BOOLEAN type and indicates TRUE or FALSE.

The base station receives the measurement report.

When the measurement result value included in the measurement report is excellent, the base station determines whether the antenna panel that has performed the measurement is in a power-on state or a power-off state before or after measurement, based on the beamforPanel parameter. If the antenna panel having an excellent measurement result is in a power-off state before or after the measurement, the base station may transmit a command to power on the antenna panel to the communication device.

Figure 9:
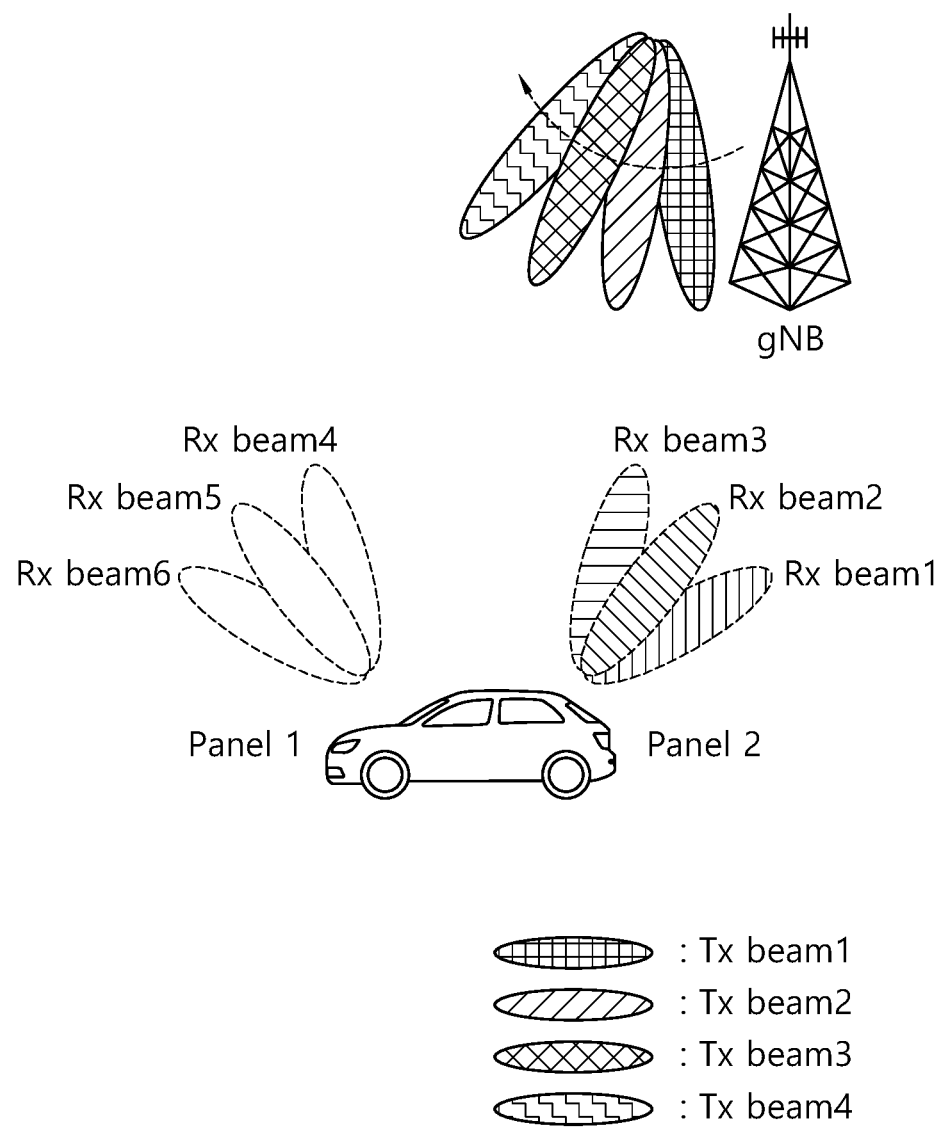
FIG. 9 is an exemplary diagram illustrating a powered-off panel and a powered-on panel among multiple antenna panels mounted on a vehicle according to an example.

FIG. 9 is an exemplary diagram illustrating a powered-off panel and a powered-on panel among multiple antenna panels mounted on a vehicle according to an example.

As shown in FIG. 9, assuming that the panel 1 and the panel 2 are mounted in a vehicle, the panel 1 may be in a power-off state, and the panel 2 may be in a power-on state. The panel 2 forms a plurality of RX beams.

Figure 10:
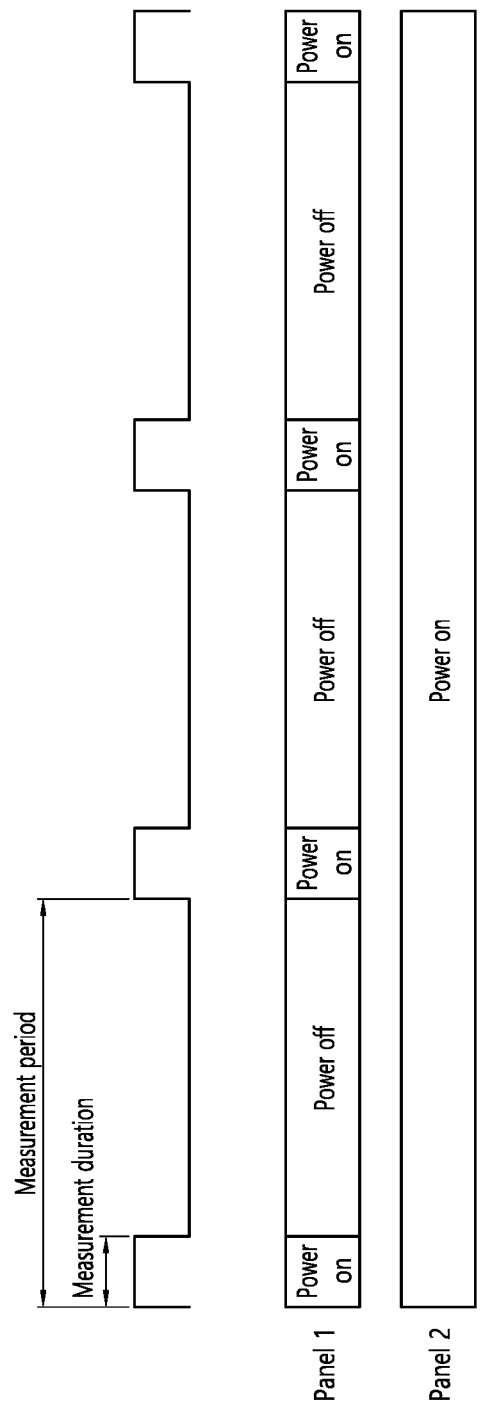
FIG. 10 is an exemplary diagram illustrating a process of performing a measurement based on the example shown in FIG. 9.

FIG. 10 is an exemplary diagram illustrating a process of performing a measurement based on the example shown in FIG. 9.

Referring to FIG. 10, it is assumed that the base station changes the transmission beams 1 to 4 while the communication device measures the RSRP. It is also assumed that the communication device also changes reception beams 1 to 6. The communication device measures and reports L1-RSRP or L3-RSRP based on a predetermined period (eg, measurement period [5, 20, 40, 80, 160] msec). At this time, if it is assumed that the reception beam used by the communication device to receive data from the base station is reception beam 2, the communication device may power on panel 2 and power off panel 1 to reduce power consumption.

The communication device may transmit a measurement report after performing the measurement. The communication device sets the value of the beamforPanel parameter to 1 (ie, TRUE) when reporting L1-RSRP or L3-RSRP for reception beams 1 to 3 (ie, antenna panel 1), and reception beams 4 to 6. When reporting L1-RSRP or L3-RSRP for (ie, antenna panel 2), the beamforPanel parameter value may be set to 0 (ie, FALSE) and transmitted.

Then, the base station can recognize that the antenna panel of the reception beam corresponding to the SSB index or the CSI-RS index in which the beamforPanel parameter value is 1 (ie, TRUE) is in a power-on state. Also, the base station may recognize that the antenna panel of the reception beam corresponding to the SSB index or the CSI-RS index in which the beamforPanel parameter value is 0 (ie, FALSE) is in a power-off state.

When the communication device maintains all antenna panels in a power-on state, the beamforPanel parameter value may always be set to 1 (ie, TRUE) and reported.

The base station may set transmission configuration indicator (TCI) state information of the communication device based on this information. For example, the TCI-state information may be set and transmitted to the communication device using only the SSB index or the CSI-RS index in which the beamforPanel parameter value is 1 (ie, TRUE). In this case, even when the base station changes the TCI-state information, the communication device can avoid using a powered-off antenna panel because the reception beam corresponding to the changed TCI-state is formed in the same antenna panel, thereby can prevent deterioration of reception performance.

Figure 11:
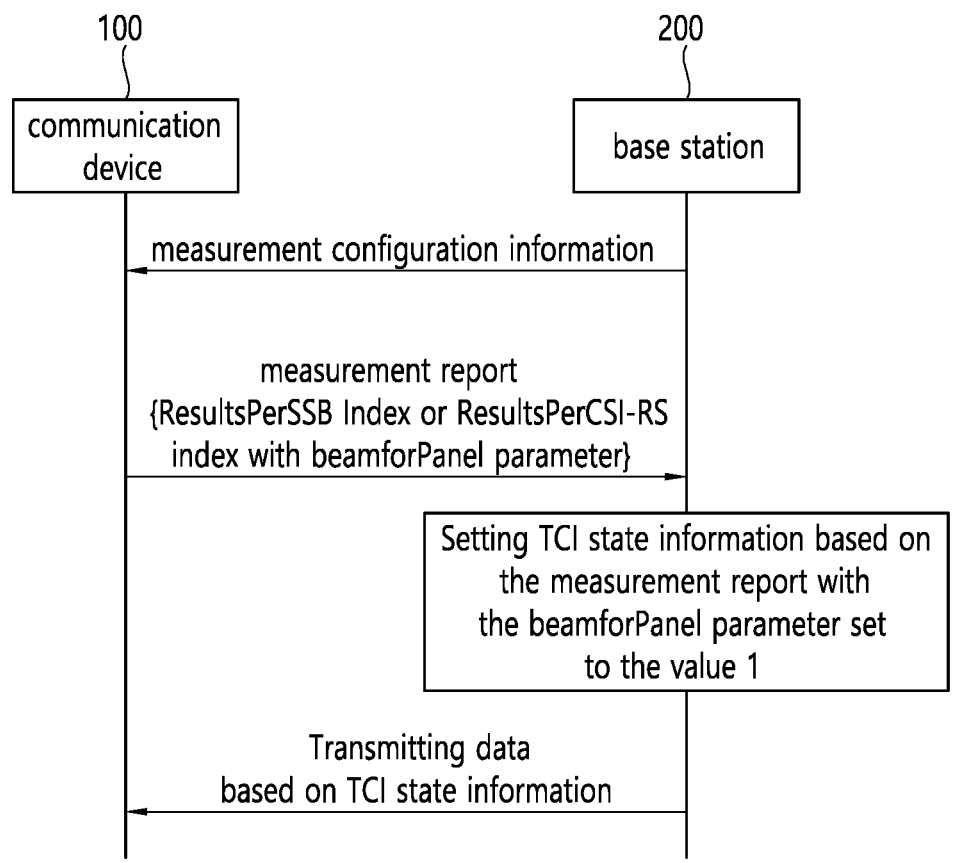
FIG. 11 is an exemplary diagram illustrating an operation of reporting power on/off of an antenna panel of a communication device and setting TCI-state information of a base station.

FIG. 11 is an exemplary diagram illustrating an operation of reporting power on/off of an antenna panel of a communication device and setting TCI-state information of a base station.

The communication device 100 receives measurement setting information.

After performing measurement based on the measurement setting information, the communication device 100 transmits a measurement report including the measurement result to the base station. The measurement report may include the aforementioned beamforPanel parameter and measurement result (eg, ResultsPerSSB Index or ResultsPerCSI-RS index).

The base station 200 sets limited TCI state information based on a measurement result having a beamforPanel parameter set to a value of 1. In addition, the active TCI state is set based on the limited (limited) TCI state setting.

The base station 200 performs data transmission based on the active TCI state.

III. Power On/Off Operation of Antenna Panel According to Link Quality of Communication Device When the reception beam of another antenna panel is required according to the link quality of the communication device, the following two methods can be considered.

Figure 12:
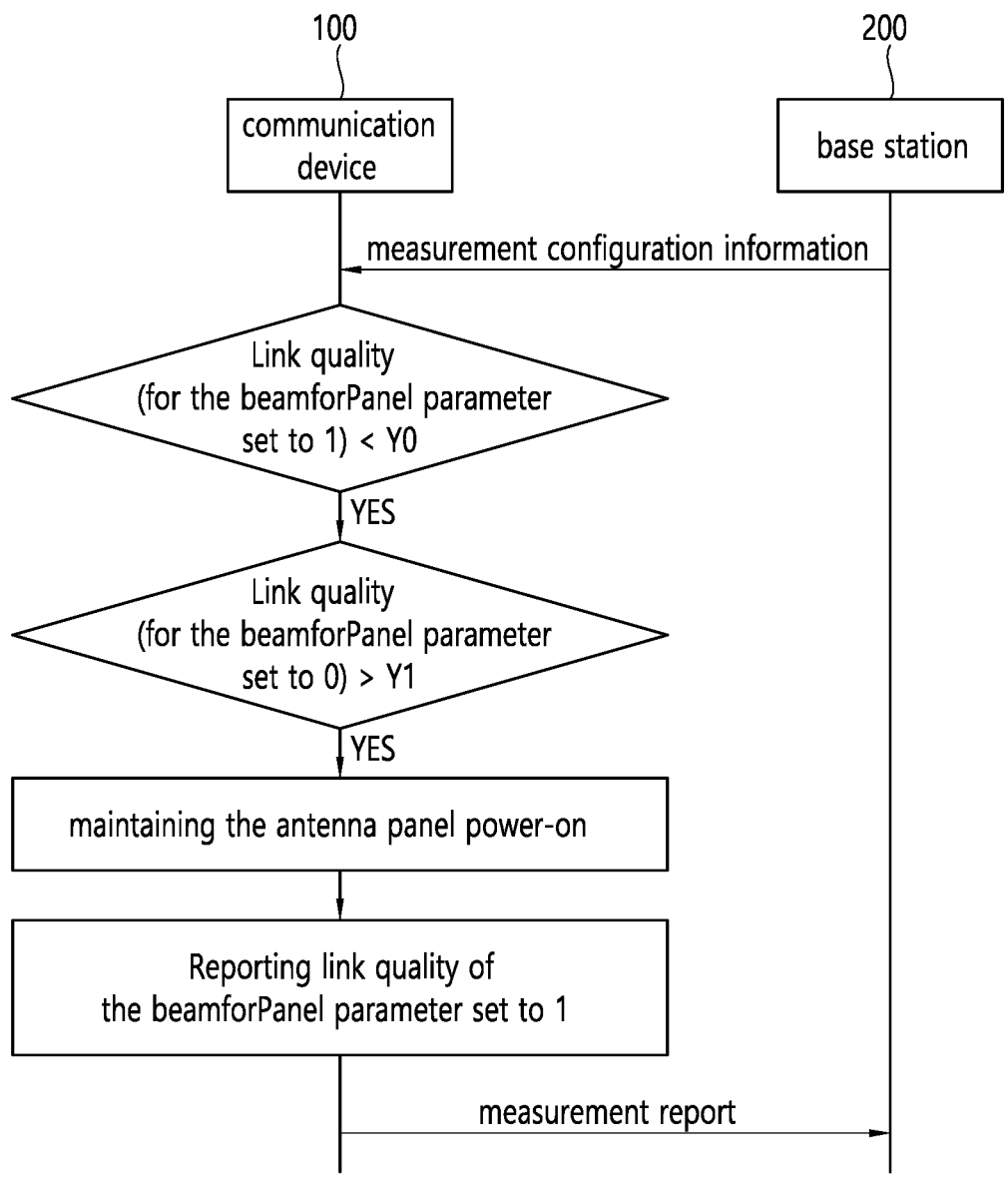
FIG. 12 illustrates an example of powering on an antenna panel in a power-off state according to link quality of a communication device.

FIG. 12 illustrates an example of powering on an antenna panel in a power-off state according to link quality of a communication device.

The communication device 100 receives measurement setting information.

Measurement is performed based on the measurement setting information.

If the communication device 100 is moving, the link quality (eg, RSRP) of the reception beams of the first antenna panel in the power-on state due to the movement of the communication device 100 can be smaller a first threshold value (eg, Y0).

Accordingly, the communication device 100 performs measurement by powering on the second antenna panel that was in the power-off state.

If the value of the link quality measured through the second antenna panel is greater than or equal to a second threshold value (eg, Y1), the communication device 100 maintains the power-on of the second antenna panel and reports the measurement After setting the beamforPanel parameter value to 1, it can be transmitted.

The first threshold value (eg, Y0) and the second threshold value (eg, Y1) may be previously received from the base station.

Figure 13:
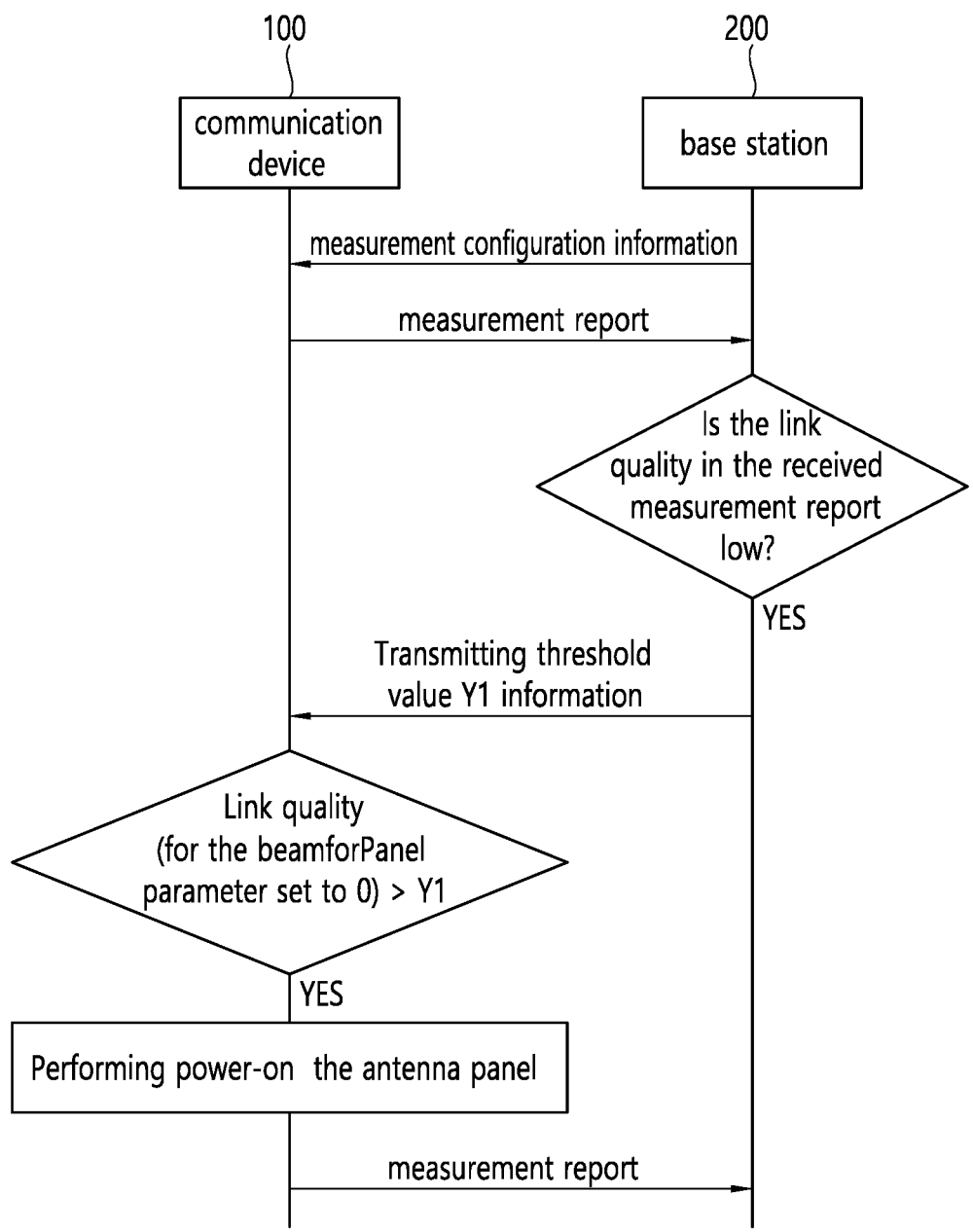
FIG. 13 illustrates another example of powering on an antenna panel in a power-off state according to link quality of a communication device.

FIG. 13 illustrates another example of powering on an antenna panel in a power-off state according to link quality of a communication device.

The communication device 100 receives measurement setting information.

The communication device 100 performs measurement based on measurement setting information.

The communication device 100 transmits a measurement report to the base station 200.

The base station determines whether the link quality in the received measurement report is lower than, for example, a first threshold value (eg, Y0).

If the link quality is, for example, lower than the first threshold value (eg, Y0), the base station 200 transmits information about the second threshold value (eg, Y1) to the communication device 100.

On the other hand, the communication device 100 judges whether the link quality of the reception beam of the antenna panel corresponding to the beamforPanel parameter value of 0 (ie, FALSE) (eg, in a power-off state) is greater than the second threshold value (eg, Y1).

If the link quality is greater than the second threshold value (eg, Y1), the communication device 100 powers on the corresponding antenna panel.

Then, a measurement report including the value of the link quality measured through the antenna panel is transmitted to the base station.

III. Summary of the Disclosures Herein

The disclosure of the present specification is summarized as follows.

A communication device according to one disclosure of the present specification includes at least one processor; and at least one memory to store instructions and operably electrically connectable to the at least one processor. Based on the instruction being executed by the at least one processor, the operations performed may include: transmitting capability information to a base station; receiving measurement configuration information from the base station; performing power-on an antenna panel in power-off state among the plurality of antenna panels for measurement; performing measurement through the plurality of antenna panels; and transmitting a measurement report message including information indicating whether the corresponding antenna panel was in power-on state or power-off state before the performing measurement, and information on a result of the measurement.

The operation may further comprise performing power-on all of the plurality of antenna panels, based on moving speed of the communication device being greater than or equal to the threshold speed; The method may further include performing power-off some antenna panels, based on moving speed of the communication device being greater than or equal to a threshold speed.

The operation may further comprise performing power-off the antenna panel, which was in power off state before the performing measurement, after the performing measurement.

The operation may further comprise performing power-off the antenna panel, which was in a power off state before the performing measurement, based on a result value of the measurement through antenna panel, which was in power-off state before the performing measurement, being smaller than a threshold value.

The operation may further comprise maintaining power-on state of the antenna panel, which was in a power off state before the performing measurement, based on a result value of the measurement through antenna panel, which was in power-off state before the performing measurement, being greater than a threshold value.

the operation may further comprise performing measurement, maintaining power-on state of the second antenna panel, based on a result value of the measurement through a first antenna panel, which was in power-on state before the performing measurement, being smaller than a result value of the measurement through a second antenna panel, which was in power-off state before the performing measurement.

The operation may comprise comparing a result value of the measurement through a first antenna panel, which was in power-on state before the performing measurement, with a first threshold value; comparing a result value of the measurement through a second antenna panel, which was in power-off state before the performing measurement, with a second threshold value.

The first threshold value and the second threshold value may be included in the measurement configuration information.

The capability information may include information indicating whether the plurality of antenna panels can be individually powered on or off.

The communication device may be a V2X (vehicle-to-everything) device, a robot, or a smartphone equipped in a vehicle.

IV. Devices in General to which the Disclosure of the Present Specification May be Applied The disclosures of the present specification described so far may be implemented through various means. For example, the disclosures of the present specification may be implemented by hardware, firmware, software, or a combination thereof. Specifically, it will be described with reference to the drawings.

Figure 14:
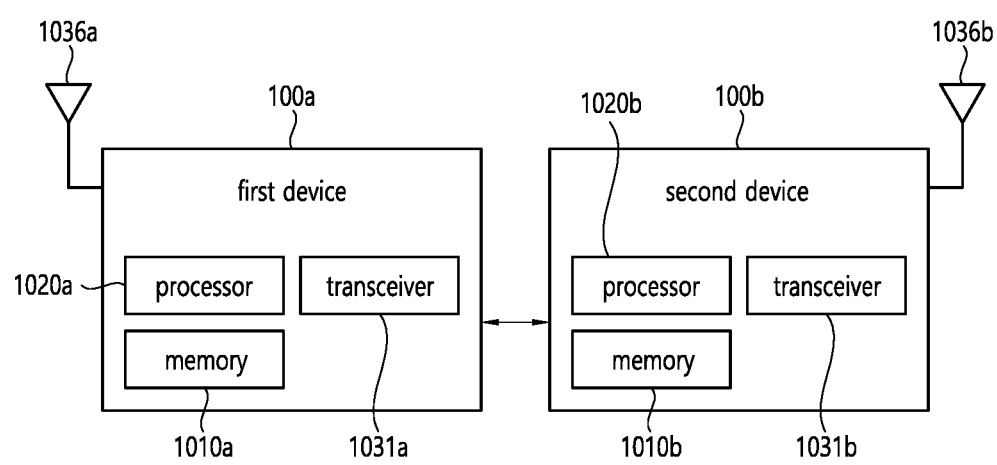
FIG. 14 shows an apparatus according to an embodiment.

FIG. 14 shows an apparatus according to an embodiment.

Referring to FIG. 14, a wireless communication system may include a first device (100*a*) and a second device (100*b*).

The first device (100*a*) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The second device (100*b*) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The first device (100*a*) includes at least one processor, such as a processor (1020*a*), and at least one memory, such as a memory (1010*a*), it may include at least one transceiver, such as transceiver (1031*a*). The processor (1020*a*) may perform the functions, procedures, and/or methods described above. The processor (1020*a*) may perform one or more protocols. For example, the processor (1020*a*) may perform one or more layers of an air interface protocol. The memory (1010*a*) is connected to the processor (1020*a*) and may store various types of information and/or commands.

The transceiver (1031a) may be connected to the processor (1020a) and may be controlled to transmit/receive a wireless signal.

The second device (100b) may include at least one processor such as a processor (1020b), at least one memory device such as a memory (1010b), and at least one transceiver such as a transceiver (1031b). The processor (1020b) may perform the functions, procedures, and/or methods described above. The processor (1020b) may implement one or more protocols. For example, the processor (1020b) may implement one or more layers of an air interface protocol. The memory (1010b) is connected to the processor (1020b) and may store various types of information and/or commands. The transceiver (1031b) may be connected to the processor (1020b) and may be controlled to transmit/receive a wireless signal.

The memory (1010a) and/or the memory (1010b) may be respectively connected inside or outside the processor (1020a) and/or the processor (1020b), and may be connected to other processors through various technologies such as wired or wireless connection.

The first device (100a) and/or the second device (100b) may have one or more antennas. For example, antenna (1036a) and/or antenna (1036b) may be configured to transmit and receive wireless signals.

Figure 15:
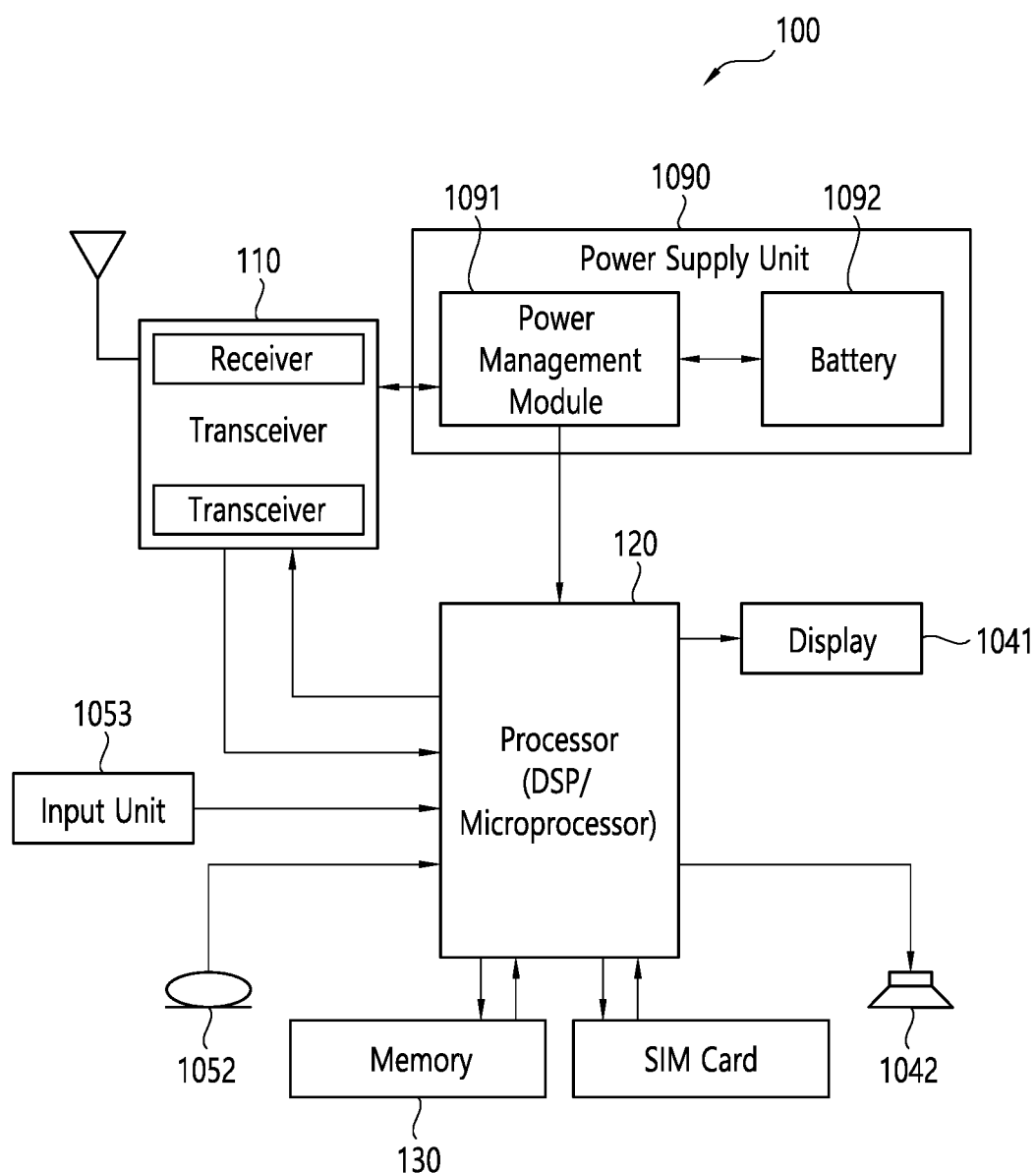
FIG. 15 is a block diagram illustrating the configuration of a terminal according to an embodiment.

FIG. 15 is a block diagram illustrating the configuration of a terminal according to an embodiment.

In particular, FIG. 15 is a diagram illustrating the apparatus of FIG. 14 in more detail above.

The device includes a memory (1010), a processor (1020), a transceiver (1031), a power management module (1091), a battery (1092), a display (1041), an input unit (1053), a speaker (1042) and a microphone (1052), SIM(subscriber identification module) card, and one or more antennas.

The processor (1020) may be configured to implement the proposed functions, procedures and/or methods described herein. The layers of the air interface protocol may be implemented in the processor (1020). The processor (1020) may include an application-specific integrated circuit (ASIC), other chipsets, logic circuits, and/or data processing devices. The processor (1020) may be an AP(application processor). The processor (1020) may include at least one of a DSP(digital signal processor), a CPU(central processing unit), a GPU(graphics processing unit), and a modem (modulator and demodulator). Examples of processor (1020) include SNAPDRAGON™ series processors manufactured by Qualcomm®, EXYNOS™ series processors manufactured by Samsung®, A series processors manufactured by Apple®, HELIO™ series processors manufactured by MediaTek®, ATOM™ series processor manufactured by INTEL® or a corresponding next-generation processor.

The power management module (1091) manages power for the processor (1020) and/or the transceiver (1031). The battery (1092) supplies power to the power management module (1091). The display (1041) outputs the result processed by the processor (1020). Input (1053) receives input to be used by processor (1020). The input unit (1053) may be displayed on the display (1041). A SIM card is an integrated circuit used to securely store an IMSI(international mobile subscriber identity) and associated keys used to identify and authenticate subscribers in mobile phone devices such as mobile phones and computers. Many SIM cards can also store contact information.

The memory (1010) is operatively coupled to the processor (1020), and stores various information for operating the processor (610). Memory (1010) may include ROM(read-only memory), RAM(random access memory), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory (1010) and executed by processor (1020). The memory (1010) may be implemented inside the processor (1020). Alternatively, the memory (1010) may be implemented outside the processor (1020), and may be communicatively connected to the processor (1020) through various means known in the art.

The transceiver (1031) is operatively coupled to the processor (1020) and transmits and/or receives a radio signal. The transceiver (1031) includes a transmitter and a receiver. The transceiver (1031) may include a baseband circuit for processing a radio frequency signal. The transceiver controls one or more antennas to transmit and/or receive radio signals. The processor (1020) transmits command information to the transceiver (1031) to transmit, for example, a radio signal constituting voice communication data to initiate communication. The antenna functions to transmit and receive radio signals. When receiving a wireless signal, the transceiver (1031) may transmit the signal for processing by the processor (1020) and convert the signal to a baseband. The processed signal may be converted into audible or readable information output through the speaker (1042).

The speaker (1042) outputs sound related results processed by the processor (1020). Microphone (1052) receives sound related input to be used by processor (1020).

The user inputs command information such as a phone number by, for example, pressing (or touching) a button of the input unit (1053) or voice activation using the microphone (1052). The processor (1020) receives such command information and processes it to perform an appropriate function, such as making a call to a phone number. Operational data may be extracted from the SIM card or the memory (1010). In addition, the processor (1020) may display command information or display information on the display (1041) for the user to recognize and for convenience.

Figure 16:
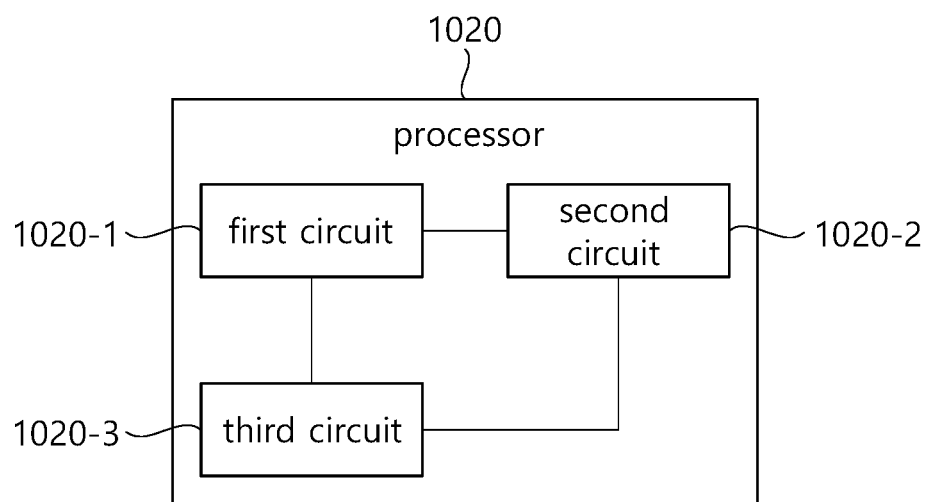
FIG. 16 shows a block diagram of a processor in which the disclosure of the present specification is implemented.

FIG. 16 shows a block diagram of a processor in which the disclosure of the present specification is implemented.

As can be seen with reference to FIG. 16, in order that the proposed functions, procedures and/or methods described in the disclosure of this specification is implemented, a processor (1020) may include a plurality of circuitry. For example, the processor (1020) may include a first circuit (1020-1), a second circuit (1020-2), and a third circuit (1020-3). Also, although not shown, the processor (1020) may include more circuits. Each circuit may include a plurality of transistors.

The processor (1020) may be referred to as an ASIC (application-specific integrated circuit) or an AP(application processor), and may include at least one of a DSP(digital signal processor), a CPU(central processing unit), and a GPU(graphics processing unit).

Figure 17:
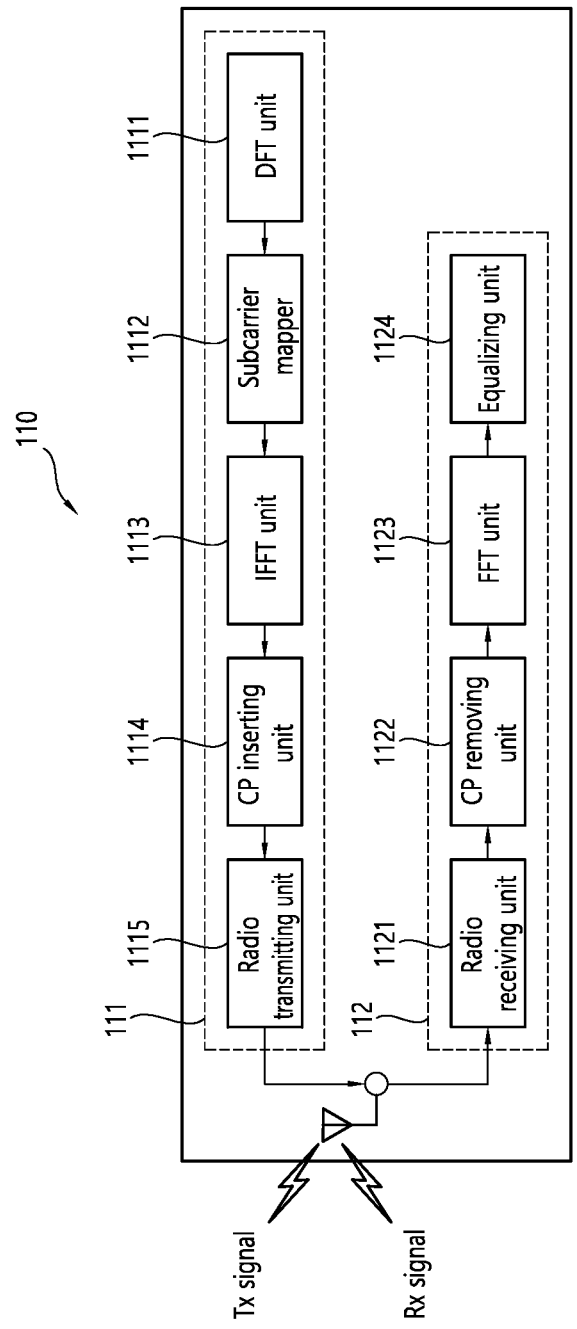
FIG. 17 is a detailed block diagram illustrating the transceiver of the first device shown in FIG. 14 or the transceiver of the device shown in FIG. 15 in detail.

FIG. 17 is a detailed block diagram illustrating the transceiver of the first device shown in FIG. 14 or the transceiver of the device shown in FIG. 15 in detail.

Referring to FIG. 17, the transceiver (1031) includes a transmitter (1031-1) and a receiver (1031-2). The transmitter (1031-1) includes a Discrete Fourier Transform (DFT) unit (1031-11), a subcarrier mapper (1031-12), an IFFT unit (1031-13) and a CP insertion unit (1031-14), and a wireless transmitter (1031-15). The transmitter (1031-1) may further include a modulator. In addition, for example, a scramble unit (not shown; scramble unit), a modulation mapper (not shown; modulation mapper), a layer mapper (not shown; layer mapper) and a layer permutator (not shown; layer permutator) may be further included, this may be disposed before the DFT unit (1031-11). That is, in order to prevent an increase in PAPR (peak-to-average power ratio), the transmitter (1031-1) passes information through the DFT (1031-11) before mapping a signal to a subcarrier. After subcarrier mapping is performed on the signal spread (or precoded in the same sense) by the DFT unit (1031-11) through the subcarrier mapper (1031-12), an IFFT(Inverse Fast Fourier Transform) unit (1031-13) to make it a signal on the time axis.

The DFT unit (1031-11) outputs complex-valued symbols by performing DFT on input symbols. For example, when Ntx symbols are input (however, Ntx is a natural number), the DFT size is Ntx. The DFT unit (1031-11) may be called a transform precoder. The subcarrier mapper (1031-12) maps the complex symbols to each subcarrier in the frequency domain. The complex symbols may be mapped to resource elements corresponding to resource blocks allocated for data transmission. The subcarrier mapper (1031-12) may be referred to as a resource element mapper. The IFFT unit (1031-13) outputs a baseband signal for data that is a time domain signal by performing IFFT on an input symbol. The CP insertion unit (1031-14) copies a part of the rear part of the base band signal for data and inserts it into the front part of the base band signal for data. ISI (Inter-symbol interference) and ICI(Inter-Carrier Interference) are prevented through CP insertion, so that orthogonality can be maintained even in a multi-path channel.

On the other hand, the receiver (1031-2) includes a radio receiver (1031-21), a CP remover (1031-22), an FFT unit (1031-23), and an equalizer (1031-24). The radio receiving unit (1031-21), the CP removing unit (1031-22), and the FFT unit (1031-23) of the receiver (1031-2) include the radio transmitting unit (1031-15) in the transmitting end (1031-1). It performs the reverse function of the CP insertion unit (1031-14) and the IFF unit (1031-13). The receiver (1031-2) may further include a demodulator.

V. Examples to which the Disclosure of the Present Specification can be Applied Although not limited thereto, the various descriptions, functions, procedures, suggestions, methods, and/or flow charts of the disclosure of the present specification disclosed may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 18:
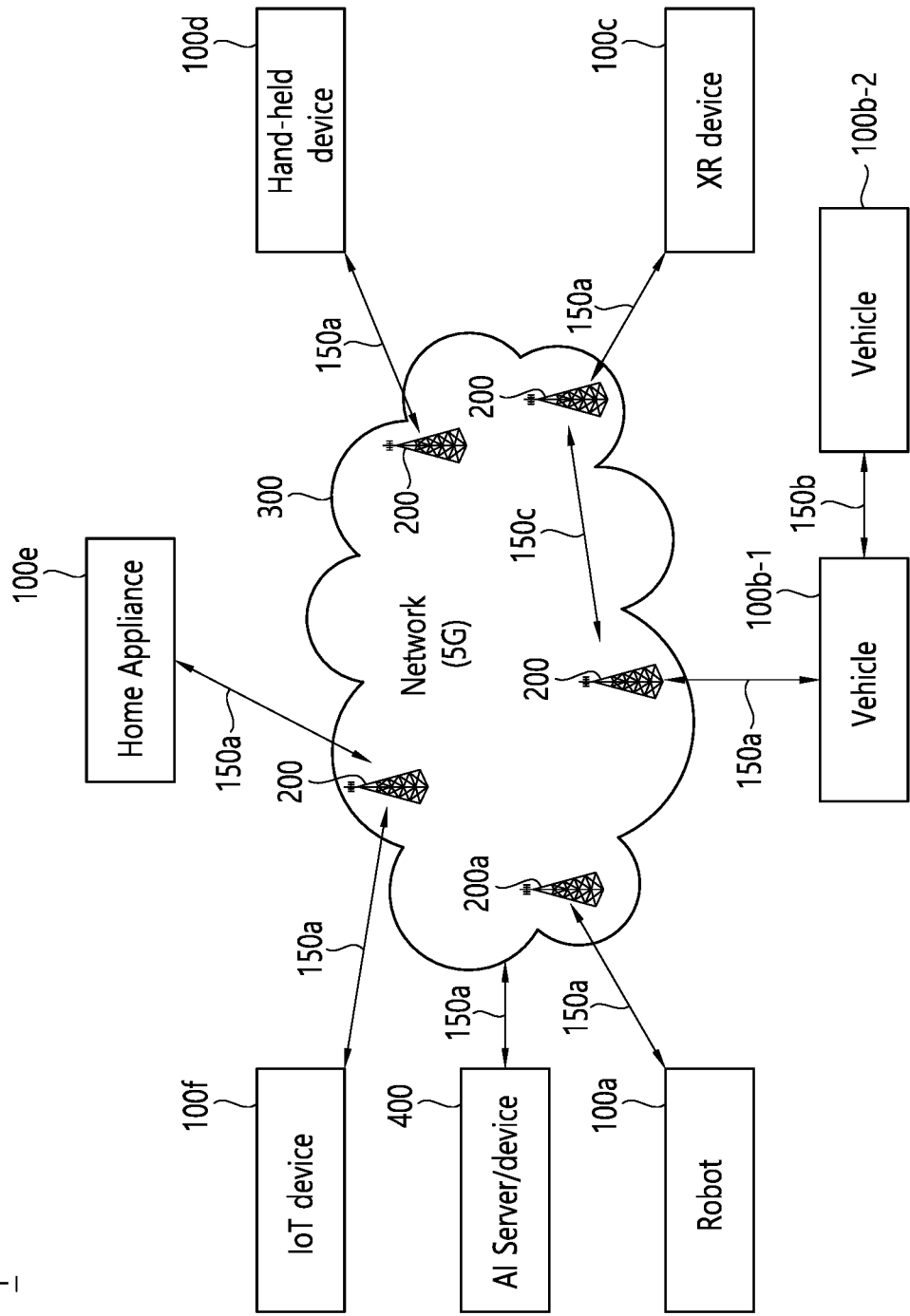
FIG. 18 illustrates a communication system 1 applied to the disclosure of the present specification.

FIG. 18 illustrates a communication system 1 applied to the disclosure of the present specification.

Referring to FIG. 18, a communication system (1) applied to the disclosure of the present specification includes a wireless device, a base station, and a network. Here, the wireless device may mean a device that performs communication using a wireless access technology (eg, 5G NR (New RAT), LTE (Long Term Evolution)), and may be referred to as a communication/wireless/5G device. Although not limited thereto, the wireless device may include a robot (100a), a vehicle (100b-1, 100b-2), an XR(eXtended Reality) device (100c), a hand-held device (100d, and a home appliance (100e), an IoT(Internet of Thing) device (100f), and an AI device/server (400). For example, the vehicle may include a vehicle equipped with a wireless communication function, an autonomous driving vehicle, a vehicle capable of performing inter-vehicle communication, and the like. Here, the vehicle may include an UAV(Unmanned Aerial Vehicle) (eg, a drone). XR devices include AR (Augmented Reality)/VR (Virtual Reality)/MR (Mixed Reality) devices, and include a HMD(Head-Mounted Device), a HUD(Head-Up Display) provided in a vehicle, a television, a smartphone. It may be implemented in the form of a computer, a wearable device, a home appliance, a digital signage, a vehicle, a robot, and the like. The portable device may include a smart phone, a smart pad, a wearable device (eg, a smart watch, smart glasses), a computer (eg, a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device (200a) may operate as a base station/network node to other wireless devices.

The wireless devices (100a-100f) may be connected to the network (300) through the base station (200). AI(Artificial Intelligence) technology may be applied to the wireless devices (100a-100f), and the wireless devices (100a-100f) may be connected to the AI server (400) through the network (300). The network (300) may be configured using a 3G network, a 4G (eg, LTE) network, or a 5G (eg, NR) network. The wireless devices (100a-100f) may communicate with each other through the base station (200)/network (300), but may also communicate directly (e.g. sidelink communication) without passing through the base station/network. For example, the vehicles (100b-1, 100b-2) may perform direct communication (e.g. Vehicle to Vehicle (V2V)/Vehicle to everything (V2X) communication). In addition, the IoT device (eg, sensor) may directly communicate with other IoT devices (eg, sensor) or other wireless devices (100a-100f).

Wireless communication/connection (150a, 150b, and 150c) may be performed between the wireless devices (100a-100f)/base station (200) and the base station (200)/base station (200). Here, the wireless communication/connection includes uplink/downlink communication (150a) and sidelink communication (150b) (or D2D communication), and communication between base stations (150c) (eg relay, TAB (Integrated Access Backhaul)). This can be done through technology (eg 5G NR) Wireless communication/connection (150a, 150b, 150c) allows the wireless device and the base station/radio device, and the base station and the base station to transmit/receive wireless signals to each other. For example, the wireless communication/connection (150a, 150b, and 150c) may transmit/receive a signal through various physical channels. To this end, based on various proposals of the present specification, At least some of various configuration information setting process for transmission/reception of a wireless signal (eg, channel encoding/decoding, modulation/demodulation, resource mapping/demapping, etc.), resource allocation process and etc may be performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. have. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method of a communication device for performing measurements through a plurality of antenna panels, comprising:
    transmitting capability information to a base station;
    receiving measurement configuration information from the base station;
    performing power-on an antenna panel in power-off state among the plurality of antenna panels for measurement;
    performing measurement through the plurality of antenna panels;
    transmitting a measurement report message including information indicating whether the corresponding antenna panel was in power-on state or power-off state before the performing measurement, and information on a result of the measurement;
    comparing a result value of the measurement through a first antenna panel with a first threshold value;
    wherein the first antenna panel was in power-on state before the performing measurement,
    comparing a result value of the measurement through a second antenna panel with a second threshold value;
    wherein the second antenna panel was in power-off state before the performing measurement.

2. The method of claim 1, further comprising:
    performing power-on all of the plurality of antenna panels, based on moving speed of the communication device being faster than or equal to a threshold speed;
    performing power-off some antenna panels, based on moving speed of the communication device being slower than the threshold speed.

3. The method of claim 1, further comprising:
    performing power-off the antenna panel after the performing measurement, wherein the antenna panel was in power off state before the performing measurement.

4. The method of claim 1, further comprising:
    based on the result of the measurement being greater than a threshold value, maintaining power-on state of the antenna panel, wherein the antenna panel was in a power off state before the performing measurement.

5. The method of claim 1,
    wherein the first threshold value and the second threshold value are included in the measurement configuration information.

6. The method of claim 1,
    wherein the capability information includes information indicating whether the plurality of antenna panels can be individually powered on or off.

7. The method of claim 1,
    wherein the communication device is a V2X (vehicle-to-everything) device, a robot, or a smartphone equipped in a vehicle.

8. A communication device for performing measurements through a plurality of antenna panels comprising:
    at least one processor; and
    at least one memory for storing instructions and operably electrically connectable with the at least one processor, based on the instructions being operated by the at least one processor, performed operation comprising:
    transmitting capability information to a base station;
    receiving measurement configuration information from the base station;
    performing power-on an antenna panel in power-off state among the plurality of antenna panels for measurement;
    performing measurement through the plurality of antenna panels;
    transmitting a measurement report message including information indicating whether the corresponding antenna panel was in power-on state or power-off state before the performing measurement, and information on a result of the measurement;
    comparing a result value of the measurement through a first antenna panel with a first threshold value;
    wherein the first antenna panel was in power-on state before the performing measurement,
    comparing a result value of the measurement through a second antenna panel with a second threshold value;
    wherein the second antenna panel was in power-off state before the performing measurement.

9. The device of claim 8, the performed operation further comprising:
    performing power-off the antenna panel after the performing measurement, wherein the antenna panel was in power off state before the performing measurement.

10. The device of claim 8, the performed operation further comprising:
    based on the result of the measurement being greater than a threshold value, maintaining power-on state of the antenna panel, wherein the antenna panel was in a power off state before the performing measurement.

11. The device of claim 8,
    wherein the capability information includes information indicating whether the plurality of antenna panels can be individually powered on or off.

12. A non-transitory computer readable storage medium having recorded instructions,
    wherein the instructions, based on being executed by one or more processors, cause the one or more processors to:
    transmit capability information to a base station;
    receive measurement configuration information from the base station;
    perform power-on an antenna panel in power-off state among the plurality of antenna panels for measurement;
    perform measurement through the plurality of antenna panels;
    transmit a measurement report message including information indicating whether the corresponding antenna panel was in power-on state or power-off state before the performing measurement, and information on a result of the measurement;
    compare a result value of the measurement through a first antenna panel with a first threshold value;
    wherein the first antenna panel was in power-on state before the performing measurement, compare a result value of the measurement through a second antenna panel with a second threshold value;

wherein the second antenna panel was in power-off state before the performing measurement.

* * * * *